UNITED STATES PATENT OFFICE.

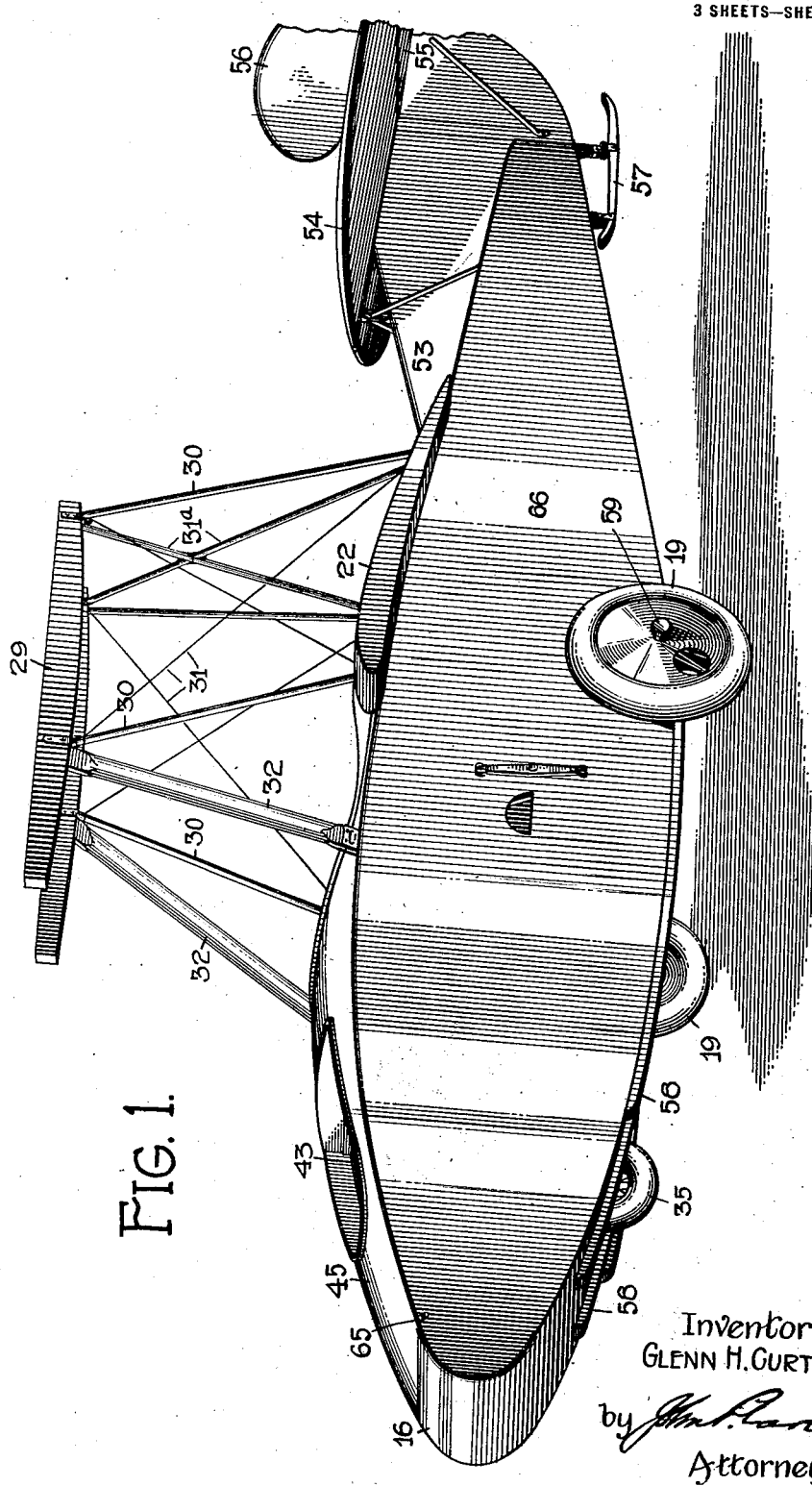

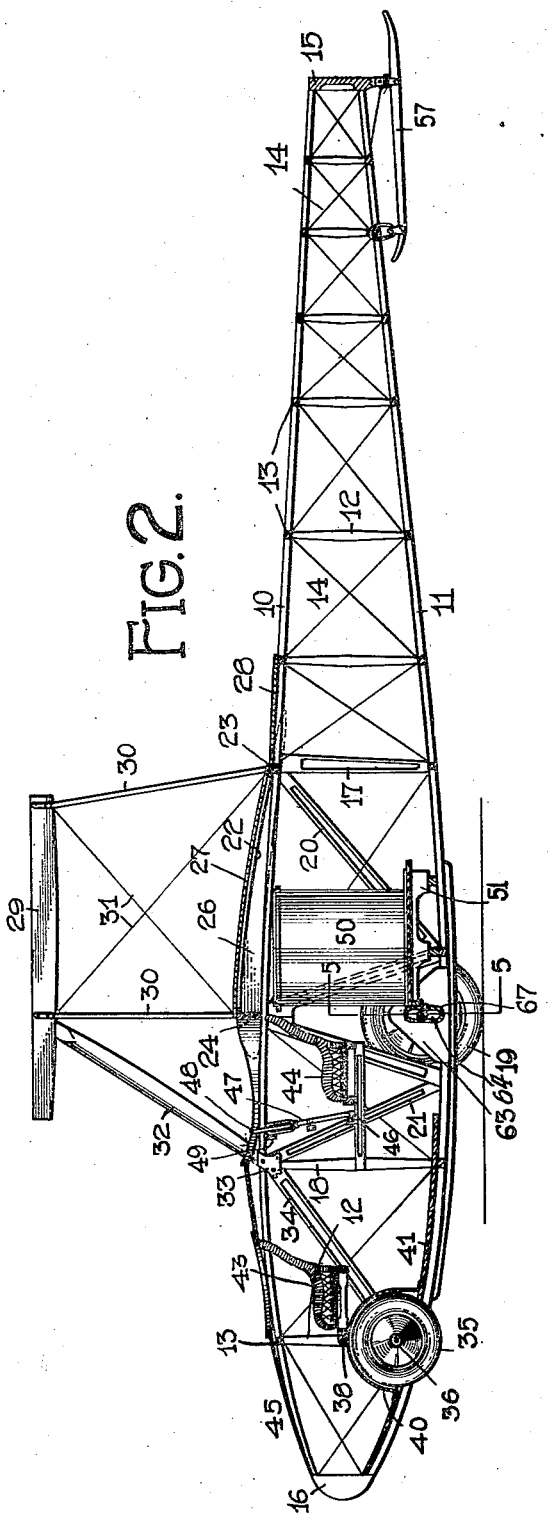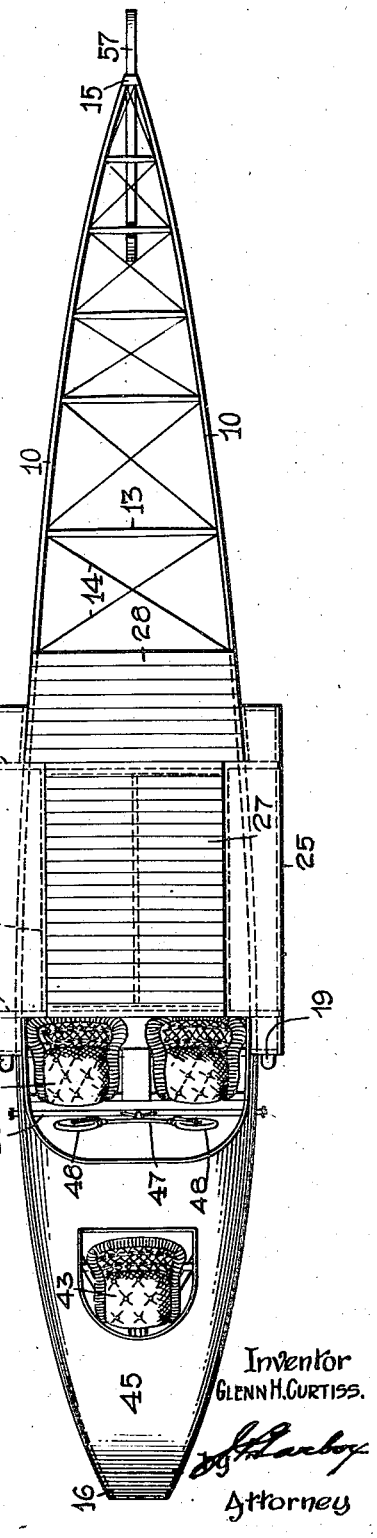

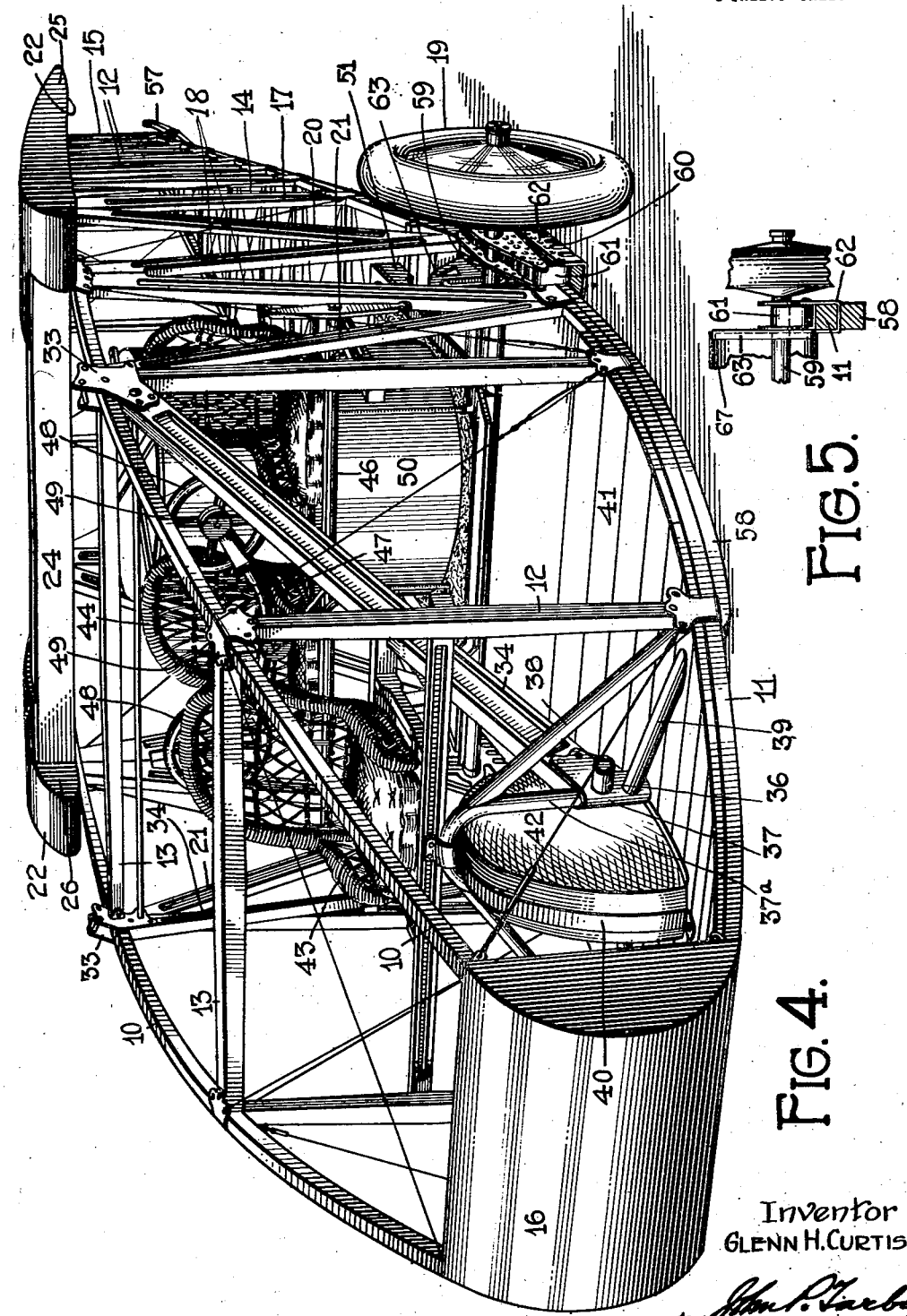

GLENN H. CURTISS, OF BUFFALO, NEW YORK, ASSIGNOR TO CURTISS AEROPLANE AND MOTOR CORPORATION, A CORPORATION OF NEW YORK.

AEROPLANE.

1,246,015.        Specification of Letters Patent.        Patented Nov. 6, 1917.

Application filed October 18, 1915. Serial No. 56,604.

*To all whom it may concern:*

Be it known that I, GLENN H. CURTISS, a citizen of the United States, residing at Buffalo, in the county of Erie and State of New York, have invented certain new and useful Improvements in Aeroplanes, of which the following is a specification.

This invention relates to the fuselage of aeroplanes and is more particularly concerned in the provision of a fuselage of exceptionally sturdy characteristics for a biplane of the "pusher" type.

As a principal object it is contemplated by the present invention to provide an aeroplane fuselage above which may be erected a bed for the power plant in a manner independent of the wing posts and solely dependent upon the fuselage itself, with a resultant insurance of great strength and durability in the completed structure, warranting the aeroplane for the heaviest service.

It is a further object of the invention to provide a landing gear for an aeroplane which will dispense with the usual undercarriage, mounting the wheels of the running gear directly upon the fuselage, and so interconnecting the landing gear with the above suspended power plant by means of braces forming intimate portions of the fuselage, that the great strains of landing will be taken up in a most desirable fashion which does not render the fuselage unduly weighty or bulky.

It is a still further object to build one panel of the supporting surface of the machine as an integral or semi-integral portion of the machine, and, in general aspects, to economize the space inclosed by the fuselage for the most comfortable accommodation of the crew and such necessary supplies as the motor fuel.

The above and additional objects, to be hereinafter more specifically treated, are accomplished by such means as are illustrated in the drawings, described in the following specification and then more clearly pointed out in the claims, which are appended hereto and form a part of this application.

With reference to the drawings, in which there is illustrated one embodiment of the invention, and throughout several views of which like characters of reference designate similar parts, Figure 1 is a view in perspective of the aeroplane fuselage evolved by the present invention, the fuselage being completely assembled, but the machine being shown as stripped of its motor and wings;

Fig. 2 is a side and longitudinal section taken through the fuselage;

Fig. 3 is a plan view of the fuselage;

Fig. 4 is an enlarged perspective view of the fuselage stripped of its fabric cover, and Fig. 5 is a detail of a wheel mounting for the running gear.

In fabrication of the fuselage provided by this invention, upper longerons 10 and lower longerons 11 are connected in the usual manner by vertical struts 12 and horizontal struts 13 to form a streamline body, the various sections of the fuselage, as defined by successive struts, being reinforced by wire cross bracing 14. Rearwardly all the longerons are connected to the vertical tail post 15 and forwardly they are connected by the rounded head-plate 16.

Posts 17 connect each pair of longerons 10 and 11, forming the rearward fuselage supports for the engine section. The forward supports for the engine section are the complementary angular posts 18, which form an A-brace on each side of the fuselage, the head of each A being connected to the corresponding longeron 10 and the legs of the A being spaced for connection to respective lower longerons 11. It is proposed to mount the engine bed immediately over this section of the fuselage and to provide the main running gear between the legs of the A-braces 18. The center of gravity of the machine is forward of the engine section posts 17, so that it becomes necessary to mount the main running gear wheels 19 some distance in advance of those posts, since it is essential that the ground contacting portion of the machine precede the center of gravity, the customary practice being from 10 to 20 inches. This is necessary for the reason that the tail of the machine must always more than counterbalance the nose if the aeroplane is to be properly landed and operated on the surface of the ground. Otherwise, the nose of the machine would be plunged into the earth rendering the complete overturning of the machine practically certain upon landing, and also hindering to a prohibitive extent the rise of the aeroplane from the ground.

While it is thus obviously necessary to mount the ground wheels 19 forward of the center of gravity of the machine, it is also necessary that such wheels be intimately braced to the engine section in a thoroughly rigid manner. The A-brace 18, constituting the forward support of the engine section of the fuselage is the novel provision of this invention which has the dual advantage of serving as one of the major motor supports as well as reinforcing the running gear structure. A back brace 20 connects the rearward leg of each A-brace with the top of the corresponding rear fuselage post 17, while the forwardly extending brace 21 performs a similar office in connecting the forward leg of these braces to the top of the adjacent vertical fuselage strut 12.

The aeroplane, as was previously mentioned, is preferably, although not necessarily, of the biplane type, the lowermost wings being adapted to be hinged laterally from a central wing panel denoted in its entirety by the numeral 22 and adapted to be interconnected in a semi-integral fashion with the fuselage structure 10. The wing panel is therefore constructed to include as its rear spar the horizontal strut 23 connecting the upper longerons 10 immediately over the fuselage posts 17. The forward spar or beam of this panel is denoted by the numeral 24 and is erected transversely of the fuselage upon the upper longerons directly over the heads of the A-braces 18. Side webs 25 which form the lateral hinging faces for the lowermost wings connect this spar 23 and beam 24 and extend therebeyond, interior webs 26 being arranged between beam and spar in the manner best illustrated in Fig. 3. It should be noted that the forward portion of this wing panel 22 is cut away so that the beam 24 serves as the forward edge of the panel, which is an economization of space to gain a more desirable arrangement of the operator's pit, as will be hereinafter fully explained. The usual fabric is stretched upon the frame work formed by the panel spar, beam and webs and a cover 27, preferably conforming to the stream-line shape of the upper wing surface, is inset thereinto to protect the wing from oil or motor fluid drippings from the engine supported immediately thereabove. The fuselage as an entirety is also exteriorly surfaced with a skin of treated fabric as best shown in Fig. 1. A fuselage cover 28 supplements the wing cover 27 for a distance immediately behind the engine section of the aeroplane.

The engine of the machine is designed to be supported upon the engine bed beams 29 erected above the engine section of the fuselage upon tubular frames 30 having their lower extremities anchored upon the wing spar 23 and the wing beam 24 respectively. These tubular supports are laterally cross-braced by wire or cable 31 and rearwardly by cross tie-tubes 31ª. Extending forwardly and downwardly from the motor bed 29 are heavy post braces 32 which diverge as they approach the fuselage and are there connected to respective fuselage struts 12 which are braced to the A-braces 18 through the medium of the diagonals 21. A suitable fuselage clip or clamp fitting 33 serves at this point of quadruple connection and is designed to further receive at the same point one extremity of the forwardly converging braces 34 which continue the braces 32, but at angles thereto, to a point of support for a forward landing wheel 35.

This forward wheel is mounted to project through the lower portion of the fuselage in order not to be engaged with the ground when the machine is maintaining its normal balance, although the wheel will be present to prevent the aeroplane from burying its nose 16 into the ground no matter at what unfortunately sharp angle the aviator attempts his landing. This wheel has a tubular hub 36 which extends through the bearing fitting 37 carried at the lower extremity of the convergent braces 34. A U-shaped supporting frame 37ª arches over the wheel 35 to connect the ends of the braces 34 and is itself triangularly braced by the tubes or bars 38 and 39 respectively to the lowermost point of each extreme forward vertical strut 12 of the machine. A strap 40 is supported upon the flooring 41 with which the lower longerons 11 are provided at this point, and peripherally encircles the wheel 35 to prevent inadvertent contact therewith, being supplemented by a fabric covering 42 to completely inclose this forward wheel, which of course operates through a suitable aperture in the said flooring.

Accommodations for the aviators are arranged forwardly of the engine section and include an observer's seat 43 placed over the single forward wheel 35 and a pair of pilots' seats 44 disposed side by side over the main running wheels 19. A single cowl 45 extends from the nose plate 16 rearwardly to the cut-out leading edge of the wing panel 22, serving to inclose both the pilot's and the observer's pits in such manner as to shelter the occupants as much as possible without interfering with their view. These seats 43 and 44 have been illustrated as chair portions mounted upon a suitable cross frame work at the proper height above the flooring 41, and upon respective braces.

The controls are of a duplex nature in order to permit of their operation by either of the pilots. A rock shaft 46 is transversely mounted in the fuselage for oscillation, having erected thereon the Y-shaped column 47, each of the branches of which extends before one of the pilots' seats 44 and carries a rotatable hand wheel 48, such hand wheels being simultaneously and similarly operable owing to flexible connections over pulleys 49 that need not be particularized in the present instance. Rearwardly of the pilots' seats and within the engine section of the aeroplane adjacent the center of gravity thereof is positioned the fuel tank 50, an arrangement to which is owing the fact that a comparatively large supply of the motive fluid may be carried upon each flight. A short platform 51 is supported upon the lower longerons of the fuselage to carry this tank.

The empennage of the aeroplane includes the stabilizing and flight control surfaces usually present in Curtiss-type biplanes, comprising the vertical fin 53, the horizontal stabilizing plane 54, elevators 55 hinged to the horizontal surface and a rudder 56 similarly hinged to the vertical surface and to the tail post 15. A skid 57 is also carried by the fuselage tail, as this portion of the machine is particularly well adapted for the support of the aeroplane upon the ground. Forward skids 58 line the edges of the longerons 11 and the flooring opening for the forward wheel 35, extending rearwardly along such flooring 41 to a point abaft the running gear.

The running gear has been described as positioned between the spaced legs of the fuselage A-braces 18 and additional points of novelty may be pointed out. The axle 59 connecting the running gear wheels 19 extends through a pair of parallel plates 60 which are traversed by a number of spaced bolts having looped thereover a suitable shock absorbing fabric 61. Two forms of this wheel mounting have been illustrated in the drawings, that of Fig. 5 being the preferred practice. In this instance the shock absorber as a whole is mounted directly over a lower longeron and a clip 62 supporting the lower ends of the resilient loops 61 extends between the longeron and the skid immediately below, such clip being formed upon the lower edge of a plate 63 slotted at 64 for the movable reception of the axle 59. This construction places the wheels 19 in immediate juxtaposition to the fuselage, thus cutting down the head resistance which would be offered by wheels projecting some distance laterally, although this latter type is also to be comprehended by the invention, as is shown in Fig. 4.

The supporting surfaces of the aeroplane have not been illustrated in the present drawings as the manner of attachment of the lower wings to the panel 22 and the erection of the upper wings over the engine section of the fuselage upon the customary adjustable posts is contemplated after the usual manner. It may be noted, however, that a special fitting 65 is carried by the fuselage nose 16 for the securement of guy wires or cables laterally diagonal to each lower wing.

It will be noted that the machine illustrated is of the land lighting type, but this invention contemplates in addition, the conversion of the flying machine shown into a hydroaeroplane. This is feasible owing to the fact that the fuselage of the machine is essentially boat shaped and capable of being employed as the float when the machine is water-borne. To do this successfully, however, it is necessary that the fuselage be inclosed in a manner preventing leaks thereinto which would render it water-logged and prevent it from satisfactorily fulfilling its purpose. To this end the entire fuselage is covered by suitable water-tight material. The forward flooring 41 may be continued rearwardly by a thin planking, while the sides of the fuselage from nose piece 16 to the tail post are to be covered by a sufficiently heavy skin fabric denoted 66. This fabric may alse be employed for the bottom of the fuselage in place of the mentioned planking, if preferred.

It will at once be observed that some provision must necessarily be made for housing the running gear in such manner as to prevent leakage into the fuselage from the resilient support therefor. This provision may consist of a tube 67 adapted to contain the landing gear axle 59, such tube being fixed in water-tight relation with the fuselage, when equipping the latter for use as a hydroaeroplane float. The fuselage, of course, is provided with no definite planing surface and planing step, as such, but from the configuration of the fuselage shown in Fig. 1 it will be apparent that the streamline body curving downwardly from the nose to the running gear and thence up sharply to the tail post is, in realiy, of a hydroaeroplane formation.

While in the foregoing, however, there has thus been illustrated in the drawings and described in the specification such combination and arrangement of elements as constitute one preferred embodiment of this invention, it is desired to emphasize the fact that such departures from the particular embodiment disclosed may be made in later adaptations of this invention as shall be recognized as within the scope of the appended claims.

What is claimed is:

1. In an aeroplane, a fuselage including longerons, an engine bed mounted above the fuselage, and engine supports widened longitudinally in the vicinity of their lower end, the widened portions interconnecting longerons and functioning conjointly as fuselage struts.

2. A fuselage for aeroplanes including an engine section comprising longerons, A-struts interconnecting superposed longerons, an engine bed, and engine bed supporting frames erected upon said struts.

3. A fuselage for aeroplanes including an engine section comprising longerons, A-struts and fuselage posts interconnecting superposed longerons, an engine bed, and engine bed supporting frames erected upon said struts and posts respectively.

4. A fuselage for aeroplanes including an engine section comprising longerons, A-struts and fuselage posts interconnecting superposed longerons, an engine bed, forwardly extending engine bed post braces, engine bed supporting frames erected upon said struts and posts respectively, and a means diagonally interconnecting the post braces and said struts.

5. A fuselage for aeroplanes including an engine section comprising an engine bed, engine bed supporting frames erected upon the fuselage, post braces arranged to extend forwardly from the engine bed, and a means continuing the post braces forwardly and intimately into the fuselage.

6. In an aeroplane, a fuselage, longitudinally spaced landing gear devices, an engine bed arranged directly above the after landing gear device, frames erected upon the fuselage to support the engine bed, and a means diagonally bracing the engine bed forwardly and intimately into the fuselage to the forward landing gear device.

7. In an aeroplane, a fuselage, longitudinally spaced landing gear devices, an engine bed arranged directly above the after landing gear device, frames erected upon the fuselage to support the engine bed, fuselage A-struts and posts arranged beneath respective frames, and a means diagonally bracing the engine bed to the forward landing gear device.

8. In an aeroplane, a fuselage, longitudinally spaced landing gear devices, an engine bed arranged directly above the after landing gear device, post braces for the engine bed secured at one end to the fuselage intermediate the respective landing gear devices, and elements of the fuselage arranged to diagonally brace said post braces respectively fore and aft to said landing gear devices.

9. In an aeroplane, a fuselage, longitudinally spaced landing gear devices, an engine bed, frames erected upon the fuselage to support the engine bed, forwardly inclined post braces for the engine bed, and elements of the fuselage continuing the post braces and the supporting frames respectively to said landing gear devices.

10. In an aeroplane, a fuselage, longitudinally spaced landing gear devices, frames erected upon the fuselage, an engine bed supported by said frames directly above the after landing gear device, post braces arranged to extend forwardly from the engine bed to the fuselage for securement at a point intermediate said landing gear devices, elements of the fuselage arranged to continue the supporting frames to the after landing gear device, and elements of the fuselage arranged to continue the post braces to both said landing gear devices.

11. In an aeroplane fuselage, longerons, a tail post connecting similar extremities of said longerons, a nose piece connecting opposite extremities of said longerons, and an A-brace intermediately connecting said longerons.

12. In an aeroplane, a fuselage, an engine bed mounted above the fuselage, supports for the engine bed widened longitudinally in the vicinity of their lower ends to function conjointly as vertical fuselage struts, and a landing gear axle arranged to extend through the fuselage intermediate said struts.

13. In an aeroplane, a fuselage including longerons interconnected by A-struts, an engine bed, frames erected at the apexes of the respective A-struts to support the engine bed, a landing gear, and a landing gear axle arranged to extend transversely through the fuselage intermediate the upper and lower longerons, intermediate the legs of the A-struts and directly beneath the engine bed.

14. In an aeroplane, a fuselage, a landing gear wheel arranged to operate partly within and partly without the fuselage, an engine bed, a wheel support, means laterally bracing said support to the fuselage, and means forwardly bracing said engine bed to said support.

15. In an aeroplane, a fuselage, an engine bed, a landing gear wheel arranged to operate partly within and partly without the fuselage, an interior structure bridging wheel, a means laterally bracing said structure to the fuselage, and a means forwardly and diagonally bracing the engine bed to a point in the vicinity of said wheel.

16. In an aeroplane, a fuselage including struts, an engine bed erected thereover, post braces connecting the bed to said fuselage, and means connecting said post braces and struts.

17. In an aeroplane, a fuselage, A-braces therefor, an engine bed supported thereover; post braces connecting the bed to a forward point of said fuselage and diagonals connecting said A-braces to the same point.

18. In an aeroplane fuselage, longerons, A-braces connecting the longerons, an engine bed, braces converging forwardly from certain longerons, and wheels supported respectively by said converging braces and between the legs of said A-braces.

19. In an aeroplane fuselage, upper and lower longerons, an engine bed, post braces diverging from said bed for connection to said upper longerons and continuing braces converging from said post braces for lateral connection to said lower longerons.

20. In an aeroplane, a fuselage, engine bed beams erected over said fuselage, post braces inclined forwardly from said beams to said fuselage, and means arranged within the fuselage to connect extremities of said post braces to a point of common support.

21. In an aeroplane, a fuselage, an engine section for the fuselage including longerons, A-braces connecting the longerons, posts also connecting the longerons, diagonals connecting each brace to the corresponding post, an engine bed and support means erecting said bed by connection to said posts and braces.

22. In an aeroplane fuselage, longerons, A-braces connecting superposed longerons and forming the forward portion of the engine section of the fuselage, fuselage posts forming the rearward portion of the engine section of the fuselage, an engine bed erected over the engine section, and supports for the engine bed erected upon said engine section.

23. In an aeroplane fuselage, longerons, A-braces connecting the longerons, a wing panel semi-integrally constructed with certain of said longerons, an engine bed arranged over said wing panel, a landing gear mounted between the feet of said A-braces, post braces connecting said engine bed to said longerons and braces diagonally connecting the feet of said A-braces to said engine bed post braces.

24. In an aeroplane fuselage, longerons, A-braces connecting superposed longerons, fuselage posts also connecting the superposed longerons, a strut connecting laterally separated longerons, a wing panel utilizing said strut as a wing spar, an engine bed arranged over said panel, posts bracing said engine bed to said longerons, a running gear mounted between the feet of said A-braces, and diagonals connecting the feet of said A-braces to said engine bed bracing posts and to said fuselage posts.

25. In an aeroplane, a forward cockpit, a rearward cockpit, braces extending diagonally into the forward cockpit, a seat supported on said braces, A-braces each having a leg extending diagonally into said rearward cockpit, and seats supported on such legs of said A-braces.

26. In an aeroplane, a forward cockpit, a rearward cockpit, converging braces arranged within said forward cockpit, a running gear member supported by said braces, a seat supported over said member by said posts, struts projecting into said rearward cockpit, running gear members mounted by said struts, and seats supported by said struts over the second said members.

In testimony whereof I affix my signature.

GLENN H. CURTISS.